United States Patent [19]

Nikitin et al.

[11] 4,420,701

[45] Dec. 13, 1983

[54] COUPLING UNIT FOR CONNECTION OF GENERATOR HIGH-VOLTAGE WINDING AND INLET BAR

[75] Inventors: Pavel Z. Nikitin, Moscow; Yanush Danilevich, Lenigrad; Konstantin N. Maslennikov, Novosibirsk; Pavel S. Kabanov, Moscow; Konstantin F. Potekhin, Novosibirsk; Lev A. Zolotov, Moscow; Anatoly A. Karymov, Leningrad; Alexandr I. Nikolsky, Moscow; Tibor M. Nemeni, Moscow; Gennady A. Bezchastnov, Moscow; Jury E. Morin, Moscow, all of U.S.S.R.

[73] Assignee: Nauchno-Issledovatelsky Sektor Vsesojuznogo Proektno-Izyskatelskogo I Nauchno-Issledovatelskogo Instituta "Gidroproekt" Imeni S.Ya. Zhuka, Moscow, U.S.S.R.

[21] Appl. No.: 414,371

[22] PCT Filed: Dec. 30, 1980

[86] PCT No.: PCT/SU80/00220

§ 371 Date: Aug. 26, 1982

§ 102(e) Date: Aug. 26, 1982

[87] PCT Pub. No.: WO82/02460

PCT Pub. Date: Jul. 22, 1982

[51] Int. Cl.³ ............................................. H02K 3/24
[52] U.S. Cl. ....................................... 310/54; 310/71
[58] Field of Search ............................. 310/52, 54, 71

[56] References Cited

U.S. PATENT DOCUMENTS

| 2,006,170 | 6/1935 | Juhlin . | |
|---|---|---|---|
| 2,929,943 | 3/1960 | Richardson et al. | 310/546 |
| 3,457,440 | 7/1969 | Horsley | 310/52 |
| 3,510,700 | 5/1970 | Grinchenko et al. | 310/54 |
| 3,955,110 | 5/1976 | Karlen | 310/54 |

FOREIGN PATENT DOCUMENTS

| 312247 | 5/1919 | Fed. Rep. of Germany . |
| 1221503 | 6/1960 | France . |
| 2333333 | 11/1976 | France . |
| 1319257 | of 0000 | United Kingdom . |
| 235167 | 3/1967 | U.S.S.R. . |

OTHER PUBLICATIONS

"Turbogenerators Design and Structure" by Titor et al., pp. 180-182.

Primary Examiner—Donovan F. Duggan
Attorney, Agent, or Firm—Fleit, Jacobson, Cohn & Price

[57] ABSTRACT

A coupling unit for connection of a generator high-voltage winding and an inlet bar comprises summary turns of the generator high-voltage winding made up of conducting layers which are insulated conductors connected in the zone of the high-voltage lead-in with the inlet bar (17) and cooling ducts. Summary turns of the generator high-voltage winding are made as concentrically arranged tubes (5,7,9,11,12) connected to one another in the zone of the high-voltage lead-in by means of template tubular elements (16) providing for gradual change over of the tube (5) of the first summary turn into a tube (7) of the second summary turn, of the tube (7) of the second summary turn into a tube (9) of the third summary turn and so on until the tube (9) of the penultimate summary turn becomes the tube (11,12) of the last summary turn of the generator high-voltage winding. Cooling ducts are divided into a central duct (6) and peripheral ducts (15) for cooling. The inlet bar (17) with a coating made up of insulation layers (8,10,13,18) and sheaths (19,20) forms a high-voltage lead-in element (23), each sheath (19) being coupled to its summary turn of the generator high-voltage winding.

1 Claim, 3 Drawing Figures

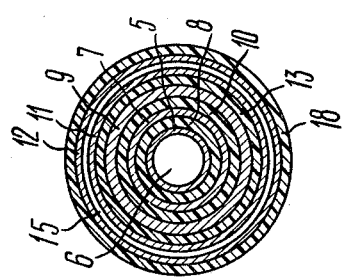
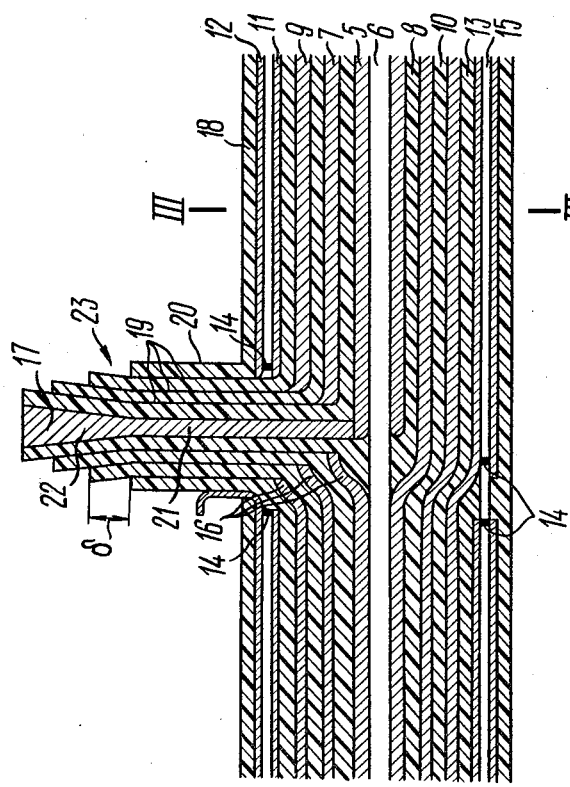

COUPLING UNIT FOR CONNECTION OF GENERATOR HIGH-VOLTAGE WINDING AND INLET BAR

FIELD OF INVENTION

The present invention relates to electrical equipment and, in particular, to a coupling unit designed to connect a generator high-voltage winding with an inlet bar.

PRIOR ART

Modern power engineering tends to use higher voltage in power transmission lines, transformers and generators in order to improve their efficiency and reduce dimensions.

However, the use of high and superhigh voltage brings in a problem of developing new coupling units for mating various high-voltage electrical elements, for example, junctions for coupling a high-voltage cable and an aerial power transmission line or a calbe lead-in of a transformer.

One of the problems in coupling a high-voltage generator and external equipment consists in providing a junction assembly for connection of the generator high-voltage winding and an inlet bar which is to be joined to some external electrical piece of equipment, for example, a high-voltage cable.

The closest prototype of the invention is a coupling unit for connection of a generator high-voltage winding and an inlet bar (Electrotechnika magazine, No. 6, 1977, G. A. Beschastnov, A. V. Ivanov-Smolensky, P. Z. Nikitin, T. M. Nemeny. High-Voltage Generators, Energia Publ., Moscow, pp. 1-2, in Russian), comprising cooling ducts and insulated conductors of the generator high-voltage winding, linked to an inlet bar, arranged in the front part of the generator stator.

The inlet bar here is a copper bus extending inside a copper pipe and electrically connected thereto. The copper pipe is inside an insulating cone formed by cutting into the frame insulation of the high-voltage winding. The copper pipe is designed to form an electric field in the zone of the high-voltage lead-in and to feed a coolant, for example, oil into the high-voltage winding.

The high-voltage winding consists of coils, cooling ducts being produced between the layers of coil turns by means of special layings, wherein the oil is fed from the copper pipe.

The known coupling unit is characterized by irregular distribution of voltage throughout the surface of the insulation cone of the coupling unit for connection of a generator high-voltage winding and an inlet bar, which can be accounted for by a sharp separation of the insulation in the high-voltage lead-in zone resulting in a highly irregular insulation medium.

This irregular distribution of voltage along the surface of the coupling unit insulation cone may lead to rupture of insulation in places where the field intensity is at its maximum. To avoid possible ruptures of insulation in the known coupling unit the insulation cone is made very large.

DISCLOSURE OF THE INVENTION

It is an object of the invention to provide a coupling unit for connection of a generator high-voltage winding and an inlet bar, whose high-voltage lead-in and such coupling of tubes of summary turns of the generator high-voltage winding in the zone of the high-voltage lead-in as to reduce dimensions and improve serviceability of said coupling unit.

The invention essentially resides in that in a coupling unit for connection of a generator high-voltage winding and an inlet bar, comprising insulated conductors of the generator high-voltage winding, located in the front part of the generator stator and joined to the inlet bar in the zone of a high-voltage lead-in, and cooling ducts, according to the invention, conducting layers made up of insulated conductors form summary turns of the generator high-voltage winding in the shape of concentrically arranged tubes connected to one another in the high-voltage lead-in zone by means of template tubular elements securing consecutive transition of the tube of a first summary turn of the high-voltage winding into the tube of a second summary turn, of the tube of the second summary turn into a tube of a third summary turn and so on until the tube of the penultimate summary turn changes over into the tube of the last summary turn of the high-voltage generator winding, which is the zero potential lead-out, the cooling ducts being separated into a central cooling duct which in this case is the internal central space of the tube of the first summary turn of the generator high-voltage winding and peripheral cooling ducts, each such duct being formed by two adjoining tubes which are electrically connected to one another and produce one summary turn of the generator high-voltage winding, whereas the inlet bar having the maximum potential and a coating composed of insulation layers separated by sheaths, each sheath being connected to its turn of the generator high-voltage winding, is made of a cylinder and a truncated cone, wherein one base of the cylinder is connected to the beginning of the first turn of the generator high-voltage winding and the other base of the cylinder is the smaller base of the truncated cone, the insulation layer with its sheath, which is adjacent to the inlet bar, being equal in height thereto, whereas each consecutive insulation layer with its sheath is arranged below the preceding insulation layer by the same value $\delta$, the high-voltage inlet element being comprised by the inlet bar plus all adjacent insulation layers with their sheaths.

The use of the present invention permits significant reduction of dimensions of a coupling unit for connection of a generator high-voltage winding and an inlet bar, which provides an opportunity to manufacture high power generators with a voltage of the stator winding going up to 500 kv. Besides, the use of the invention permits improvement of serviceability of the coupling unit and the generator as a whole through a more effective voltage compensation along the surface of high-voltage inlet element.

BRIEF DESCRIPTION OF THE DRAWINGS

The invention will now be described in greater detail with reference to a specific embodiment thereof and accompanying drawings, wherein:

FIG. 2 shows a longitudinal section view of a coupling unit for connection of a generator high-voltage winding and an inlet bar, which corresponds to the unit A of FIG. 1, according to the invention;

FIG. 3 shows a section view along III-III of FIG. 2, according to the invention.

BEST MODE FOR CARRYING OUT THE INVENTION

Figure 1:
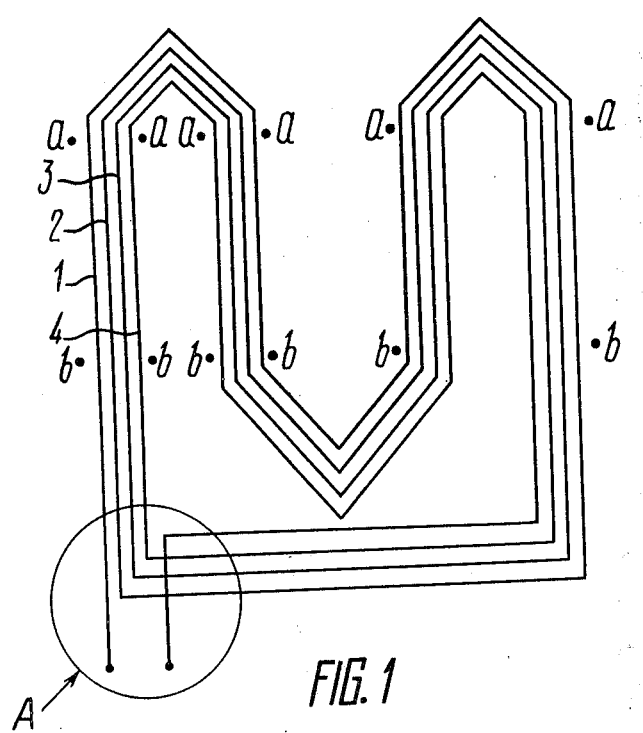
FIG. 1 shows a circuit connection diagram of high-voltage winding turns, according to the invention.

Referring to FIG. 1, a simplified electrical circuit shows a high-voltage generator winding made of one four-layer cable fitted into four slots of the generator stator. A conducting layer 1 of the cable changes into a conducting layer 2, the conducting layer 2 changes into a conducting layer 3 and the conducting layer 3 changes into a conducting layer 4 of the cable. The beginning of the layer 1 is the start of the generator high-voltage winding, whereas the end of the layer 4 is the zero potential lead-out.

Referring to FIG. 2, it shows the design of the unit A of FIG. 1. The conducting layer 1 is in the center of the cable and forms the first summary turn which in this case is a tube 5 featuring a central cooling duct 6.

A summary turn here means a totality of all turns formed by the tube of a given layer. Thus, for example, the tube of the conducting layer 1 (FIG. 1) forms a summary turn comprising two connected in series and fitted into four slots of the generator stator. (Portions ab of FIG. 1 correspond to stator slots). The conducting layer 2 forms a second summary turn which is a tube 7 arranged concentrically with respect to the tube 5 and separated by a layer 8 of insulation therefrom.

The conducting layer 3 forms a third summary turn which is a tube 9 arranged concentrically with respect to the tubes 5 and 7 and separated from the tube 7 by an insulation layer 10. The conducting layer 4 forms a fourth summary turn which comprises two adjacent tubes 11 and 12 arranged concentrically to each other and to the tubes 5,7 and 9. The tube 11 is separated from the tube 9 by an insulation layer 13 from the tube 9. The tubes 11 and 12 are electrically coupled to each other by connecting jumpers 14.

The space between the tubes 11 and 12 is a peripheral cooling duct 15.

In the zone of the high-voltage lead-in, which corresponds to the unit A of FIG. 1, the concentrically arranged tubes 5 (FIG. 2), 7,9,11 and 12 are connected to one another by means of template tubular elements 16 which ensure gradual change-over of the tube 5 of the first turn into the tube 7 of the second turn, change-over of the tube 7 of the second turn into the tube 9 of the third turn, of the tube 9 of the third turn into the tubes 11 and 12 of the fourth turn which is the zero potential lead-out.

An inlet bar 17 has the maximum potential in the high-voltage winding of the generator and is coated with the insulation layers 8, 10 and 13 and a layer 18 of outer insulation. The insulation layers 8, 10 and 13 are separated, in the area enveloping the inlet bar 17, by sheaths 19. The outer insulation layer 18 is covered in this area by a sheath 20.

The inlet bar 17 is a copper bus connecting the beginning of the tube of the first summary turn to a copper bus of the external device.

Each sheath 19 is connected to its turn of the high-voltage winding of the generator.

The inlet bar 17 comprises a cylinder 21 and a truncated cone 22, one base of the cylinder 21 being connected to the beginning of the first turn of the high-voltage winding of the generator, whereas the other base of the cylinder 21 is the smaller base of the truncated cone 22.

The insulation layer 8 with its sheath 19 is adjacent to the inlet bar 17 and equal in height therewith. Each next insulation layer 10 and 13, as well as the outer insulation layer 18 with its sheaths 19 and 20, is lower than the preceding insulation layer by the same value $\delta$. The inlet bar 17 and all adjacent insulation layers 8,10 and 13 with the sheaths 19, as well as the outer insulation layer 18 with its sheath 20, form a high-voltage lead-in element 23.

FIG. 3 shows a section view taken along line III—III of FIG. 2 explanatory of the design of the four cable of the high-voltage winding.

Operating conditions of insulation in the cone of the known coupling unit for connection of a generator high-voltage winding and an inlet bar sharply deteriorate since the electric field produced at the edges of conducting elements having a high potential is extremely irregular and insulation can be ruptured.

In oder to compensate voltage along the insulation cone its dimensions should be increased which results in a more complex geometry of the surface, required to ensure a specific intensity of the electric field. This is still more important with voltages of 220 and 500 kv.

In the proposed coupling unit for connection of a generator high-voltage winding and an inlet bar each sheath 19 and 20 (FIG. 2) of the high-voltage lead-in element 23 is electrically connected to its summary turn of the high-voltage winding which permits defining the voltage drop between the sheaths 19 and 20 of the high-voltage lead-in element 23. With this the value $\delta$ can be set to a minimum determined by the electrical strength of the insulation at a given voltage drop between the adjacent sheaths 19 and 20.

Since the generator high-voltage winding is a multilayer cable and each sheath 19 and 20 (FIG. 2) of the high-voltage lead-in element 17 is connected to its conducting layer 1,2,3 and 4 (FIG. 1) of the cable, equal voltage drop across the sheaths 19 and 20 (FIG. 2) can be attained.

The invention permits production of high power generators with the voltage of the stator winding reaching 500 kv.

INDUSTRIAL APPLICABILITY

The invention can be used for manufacturing high-power generators, as well as turbogenerators, for thermal and nuclear power plants and high-power transformers.

We claim:

1. A coupling unit for connection of a generator high-voltage winding and an inlet bar, comprising insulated conductors of the generator high-voltage winding, located in the front part of the generator stator and joined to the inlet bar in the zone of a high-voltage lead-in and cooling ducts characterized in that conducting layers (1,2,3,4) made up of insulated conductors form summary turns of the generator high-voltage winding in the shape of concentrically arranged tubes (5,7,9,11,12) connected to one another in the high-voltage lead-in zone by template tubular elements (16) securing consequtive transition of the tube (5) of the first summary turn of the high-voltage winding into the tube (7) of the second summary turn, of the tube (7) of the secondary summary turn into a tube (9) of the third summary turn and so on until the tube (9) of the penultimate summary turn changes over into the tube (11 and 12) of the last summary turn of the high-voltage generator winding, which is the zero potential lead-out, the cooling ducts being separated into a central cooling duct (6) which, in this case, is the internal central space of the tube of the first summary turn of the generator high-voltage winding and peripheral cooling ducts (15), each such duct being formed by two adjoining tubes (11 and 12) which are electrically connected by jumpers (14) and produce one summary turn of the generator high-voltage winding, whereas the inlet bar (17) having the maximum potential and a coating composed of insulation layers (8,10,13) separated by sheaths (19), each sheath (19) being connected to its turn of the generator high-voltage winding, is made of a cylinder (21) and a truncated cone (22), wherein one base of the cylinder (21) is connected to the beginning of the first summary turn of the generator high-voltage winding and the other base of said cylinder (21) is connected to the beginning of the first summary turn of the generator high-voltage winding and the other base of said cylinder (21) is the smaller base of the truncated cone (22), the insulation layer (8) with its sheath (19), which is adjacent to the inlet bar (17) is equal in height thereto, whereas each sunsequent insulation layer (10,13) with its sheath (10) is arranged below the preceding insulation layer by the same value $\delta$, the inlet bar (17) and all adjacent insulation layers (8,10,13,18) with their sheaths (19,20) constituting a high-voltage inlet element (23).

* * * * *